F. E. BOWERS.
SPARE TIRE CASE.
APPLICATION FILED OCT. 16, 1907.
915,265.
Patented Mar. 16, 1909.
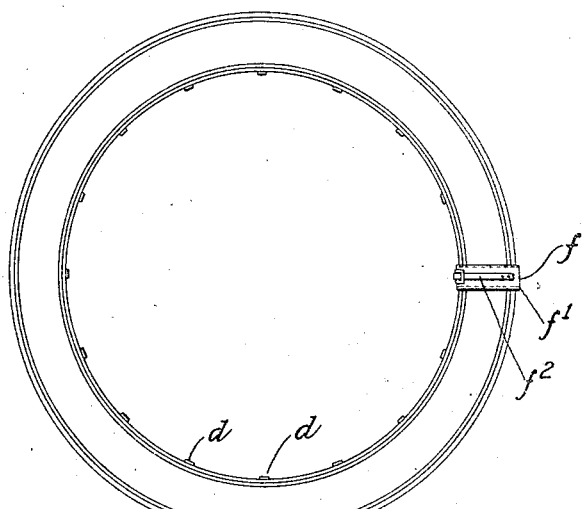
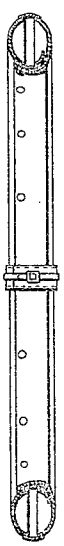
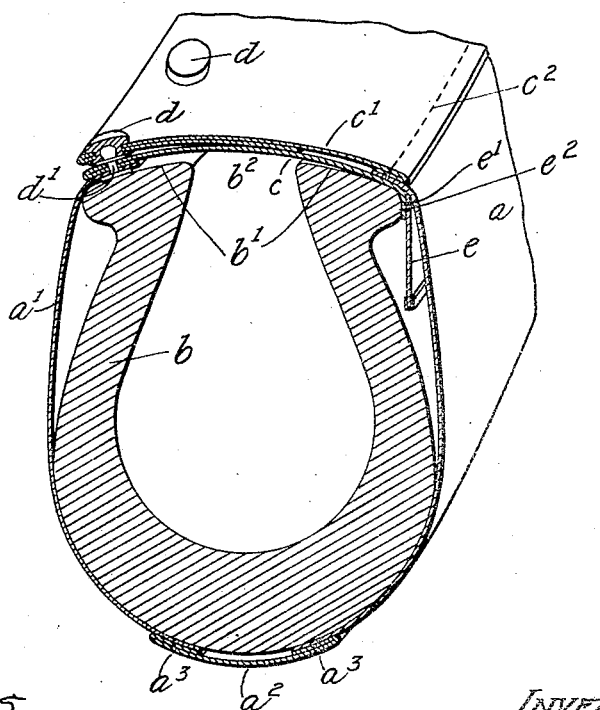

UNITED STATES PATENT OFFICE.

FREDSON E. BOWERS, OF NEW HAVEN, CONNECTICUT.

SPARE-TIRE CASE.

No. 915,265.　　　Specification of Letters Patent.　　　Patented March 16, 1909.

Application filed October 16, 1907. Serial No. 397,654.

*To all whom it may concern:*

Be it known that I, FREDSON E. BOWERS, a citizen of the United States, residing at New Haven, in the county of New Haven and State of Connecticut, have invented certain new and useful Improvements in Spare-Tire Cases; and I do hereby declare the following to be a full, clear, and exact description of the invention, such as will enable others skilled in the art to which it appertains to make and use the same.

My invention relates to covers or cases for tires and more particularly to the so-called "spare tire" cases now so extensively used by automobilists to receive the spare "shoe" carried on automobiles and to protect the same from dust and dirt and the action of the weather.

The object of my invention is to so construct such a case that it will effectually protect the shoe inclosed therein and prevent the entrance of water to the interior of the shoe and also provide simple and effective fastening means for securing the cover to the shoe.

To the above ends my invention consists of the improved tire case which will now be described and claimed.

My invention is illustrated in the accompanying drawing in which:—

Figure 1 shows a side view of my improved case as it will appear when in use. Fig. 2 shows an edge view thereof. Fig. 3 shows a sectional view, and Fig. 4 shows an enlarged sectional perspective view.

My improved tire case consists of a part to cover the tread and sides of the tire, and for the purpose of producing a neat fitting case this part is preferably constructed of the two substantially circular or ring shaped pieces $a$ and $a'$ cut in ring form and of substantially the diameter of the tire or shoe to be inclosed therein. These two ring shaped pieces of material $a$ and $a'$ are united by a crown strip $a^2$, these parts being stitched or otherwise secured together, as shown at $a^3$.

Viewing Fig. 4 of the drawing, it will be noted that the parts $a$, $a'$ and $a^2$ cover the sides and tread portion of the spare tire or shoe $b$. To cover and protect the rim portion $b'$ of the spare tire or shoe, which is usually provided with an opening $b^2$ to receive the inner tube, I have provided the overlapping flaps $c$ and $c'$, the flap $c'$ being stitched or otherwise secured at $c^2$ to the side piece $a$, and the flap $c$ being stitched or otherwise secured to the side piece $a'$. It will be noted that these overlapping flaps are substantially of a width to extend entirely across the rim portion of the tire or shoe, and in order to fasten the case thereon the free edge of the flap $c'$ is provided with members of a series of ball and socket fastenings $d$ which coöperate with and engage the complimentary fastening members $d'$ attached to the flap $c$ along its inner edge or along the line of union of the flap $c$ and the side $a'$. Thus it will be seen that when the case is fastened on the tire or shoe the fastenings $d$ will extend around the rim portion and along one edge thereof, and upon the inner surface of the rim portion. In order to effectually prevent the entrance of dust and dirt into the opening $b^2$ of the tire or shoe, the inner flap $c$ at its inner or free edge will be provided with a guard flap $e$, which is cut in the form of a ring in the same manner as the sides $a$ and $a'$ are cut, its inner diameter being substantially that of the inner diameter of the tire or shoe, and this ring shaped guard $e$ is stitched or otherwise secured at $e'$ to the inner edge of the flap $c$, so that when the case is placed upon a tire the guard $e$ will assume the position shown in Fig. 4 of the drawing, lying smooth and in a circular form about one side of the shoe or tire. Thus it will be noted that before any water, dust or dirt can get into the opening in the tire or shoe it will be necessary for it to pass between the two overlapping flaps $c$ and $c'$ and over the outer edge of the guard $e$, thence down on the inside of the guard $e$ and beneath the flap $c$, and this will be effectually prevented by reason of the fact that the elasticity of the rim portion of the tire causes a clamping of the guard $e$ at the point $e^2$ against the inner surface of the side $a$.

It is of course understood that all the parts of the casing are divided at the point $f$ so as to permit the introduction of the tire or shoe thereinto, and this joint or opening is closed, as by the band $f'$, and a strap and buckle $f^2$.

Having described my invention I claim as new and desire to protect by Letters Patent of the United States:—

1. A cover or casing for spare tires having overlapping flaps extending entirely across the rim portion of the tire or shoe, the inner flap being provided at its inner edge with a flexible circular guard cut in ring-form extending at right angles thereto and about the side of the tire and adjacent to the rim portion thereof, substantially as described.

2. A spare case having overlapping flaps extending across the rim portion of the tire and provided with mating ball and socket fastenings, the inner flap having at its inner edge a circular guard cut in ring form extending at right angles thereto, substantially as described.

In testimony whereof I affix my signature, in presence of two witnesses.

FREDSON E. BOWERS.

Witnesses:
T. HART ANDERSON,
MARY T. KENNEY.